United States Patent Office 3,464,716
Patented Sept. 2, 1969

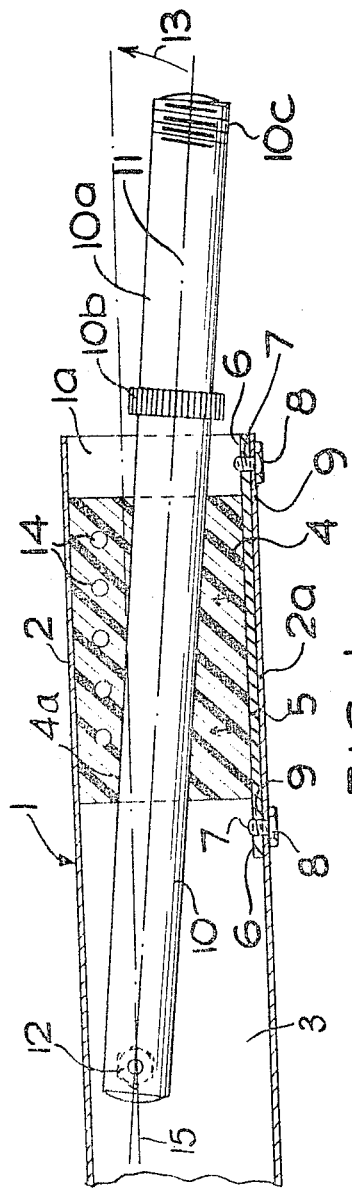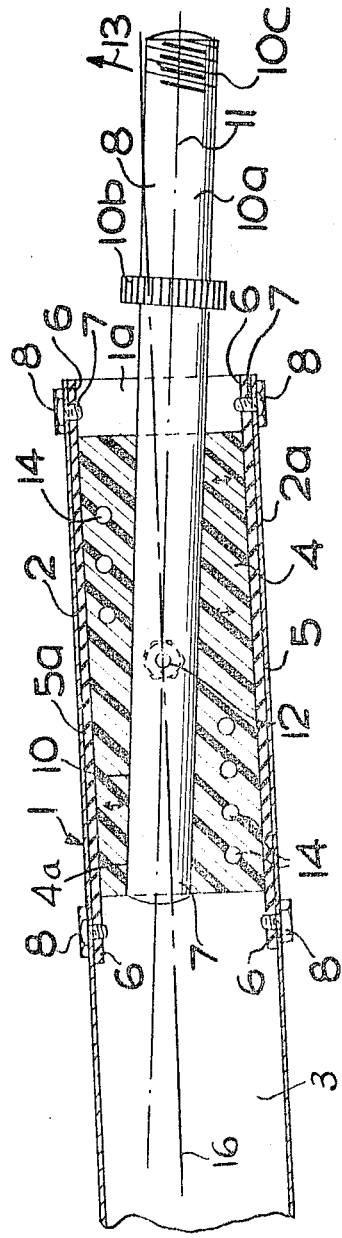
FIG. 1
FIG. 2

3,464,716
VEHICLE SUSPENSION SYSTEM
Robert Butler, North Sway Cottage,
Sway, Hampshire, England
Filed Dec. 21, 1967, Ser. No. 692,468
Int. Cl. B60g *3/00, 25/00*
U.S. Cl. 280—124
10 Claims

ABSTRACT OF THE DISCLOSURE

A resilient suspension for suspending wheels from a frame and comprising a tubular member fixed to the frame, a resilient bushing mounted in the tubular member, and an axle arm passing through a bore in the bushing and extending beyond the tubular member. The axle arm is secured to the tubular member by a pivot pin and the outer end of the arm is adapted for mounting a wheel thereon.

---

The invention relates to vehicle suspension systems, in particular to suspension means for wheeled vehicles including motor vehicle trailers, motor scooters, wheel barrows and bicycles. It is a feature of a suspension unit constructed in accordance with the invention that the dual requirements of a resilient connection between the chassis or frame and wheels of a vehicle and an adequate damping of the said connection, are satisfied together in the same, single combination of parts thus avoiding the expense and complication of separate springing means and damping means.

In a vehicle frame or chassis supported on a wheel or wheels through the intermediary of resilient suspension means, the invention resides in the combination of a tubular member adapted to form part of or to be attached to the frame or chassis and having at least one end defining an opening; a bushing made of a resiliently deformable material located within the said end of the said member; a swinging arm carried by the resilient bushing, partly inside the said member and partly projecting beyond the said end of the said member; means provided on the projecting part of the swinging arm for mounting a wheel thereon, and a pivot bolt passing through apertures defined in opposite side walls of the said member and through a diametric or transverse hole defined in the inside part of the swinging arm, whereby the said arm is secured for pivoting movement with respect to the said member and said movement is resiliently limited by the said bushing.

The tubular member can be disposed transversally with respect to the normal direction of travel of the vehicle with opposite ends of the said member preferably each adapted in accordance with the invention to carry a wheel in a conventional arrangement, i.e., where the two wheels are located in alignment at opposite sides of the vehicle. Alterntaively, the tubular member can be disposed longitudinally with respect to the normal direction of travel of the vehicle with the axis of rotation of the wheel disposed at a right angle relative to the longitudinal axis of the said member, depending on the nature of the means by which the wheel is mounted on the swinging arm, for example forked means or castor means, provided on the projecting end of the swinging arm for carrying a wheel.

The bushing is preferably made of rubber or of a resiliently deformable plastics material and is preferably secured by bonding or an adhesive material to at least one metal plate through which the said bushing can be secured within the tubular chassis or frame member. For example, the plate with the bushing bonded or adhered thereto can slidably engage under flanges or rails formed inside the tubular member or can be bolted to the said member.

Each suspension arrangement shown in the drawings is basically composed of a rectangular section tubular frame or chassis member having two opposite side walls which are larger in depth than the width of its upper and lower walls and having at least one end defining an opening; a unit composed of—a rectangular section bushing made of a resiliently deformable material and having an internal wall defining a bore through the bushing, a swinging arm carried by the bushing in the said bore and secured to the said internal wall by bonding or an adhesive material, and a rectilinear metal plate onto which the bushing is secured by bonding or an adhesive material, the said unit being secured within the open end of the said tubular member to the lower wall of said member by securing means with a part of the swinging arm projecting beyond said open end, means provided on the projecting part of the swinging arm for mounting a wheel thereon, and a pivot bolt passing through apertures defined in the opposite side walls of the said member and through a diametric or transverse hole defined in the part of the swinging arm located inside the said member, whereby the said arm is secured for pivoting movement relative to said member in an upright plane of rotation parallel to said opposite side walls and said movement is resiliently limited by the said bushing.

Two preferred embodiments of the invention are hereinafter described, by way of example, with reference to the accompanying drawings, in which:

FIGURE 1 is a side elevation in partial section of a first suspension arrangement; and FIGURE 2 is a similar illustration of a second embodiment of the invention.

In the following description like parts are referred to by the same reference numerals. For a better understanding of the invention only one cross-sectional shape of the tubular chassis or frame member is illustrated, namely, a rectangular cross-section having a larger depth than width, though it should be understood that almost any cross-sectional shape of the said member could be employed in the performance of the invention. For convenience of illustration each figure shows only one end of the tubular member 1. The said member 1 can comprise an integral part of a vehicle chassis or can comprise a separate part which is attachable by boiling or welding to a vehicle chassis, e.g., of welded construction, or to a vehicle frame, e.g., a stressed-steel, unitary structure.

In each figure, the rectangular cross-section tubular member 1 is made of steel and has narrow upper and lower walls 2 and 2a, respectively, and comparatively deep side walls 3, said walls defining an opening 1a in the end of the member 1. A resiliently deformable bushing 4, made of rubber, has a similar cross-sectional shape to that of the member and is located, through the opening 1a, within the end of the member 1.

In FIGURE 1 the bushing 4 is bonded by rubber-to-metal bonding onto a rectangular steel plate 5 which has end portions extending beyond opposite ends of the bushing 4 forming flanges 6 provided with threaded holes 7. The bushing 4 and the plate 5 are located, as a unit, through the end opening 1a snugly inside the end of the member 1, and the said unit is secured within the member 1 by means of threaded bolts 8 which pass through holes 9 in the lower wall 2a of the member 1 and engage in the threaded holes 7 formed in the end flanges 6 of the plate 5. Only two bolts 8 are shown in FIG. 1, though it should be understood that more securing bolts 8 can be employed with a corresponding additional member of threaded holes 7, in the flanges 6.

In the embodiment of FIGURE 2, the bushing 4 is bonded to a further rectangular plate 5a which is located on the upper opposite side of the bushing 4 with respect to the first plate 5. The further plate 5a is secured to the inside of the upper wall 2 of the member 1 in the same way that the plate 5 is secured to the inside of the lower wall 2a, as previously described.

Carried by the bushing 4 in a bore 4a therethrough, is a circular cross-section, steel swinging arm 10 with its longitudinal axis 11 inclined at an angle with respect to the wall 2a of the tubular member 1 and parallel with respect to the opposite side walls 3 of the member 1. The swinging arm 10 is bonded to the bushing 4 at the inside wall of the said bore 4a by rubber-to-metal bonding. Part of the swinging arm 10 is located inside the member 1 and the other part of the said arm projects from the opening 1a at the open end of the member 1. The projecting part of the swinging arm 10 forms a stub axle 10a, with a collar 10b and a threaded end 10c, on which axle a wheel can be carried and retained by a hub nut (not shown). The projecting part of the swinging arm need not be limited to the form of a stub axle and can be forked or provided with a castor bearing, pivot or king pins, steering linkages and the like conventional arrangements.

In the embodiment of FIGURE 1, the swinging arm 10 is pivotally secured at its innermost end within the member 1 by means of a pivot bolt 12 located along center line 15 passing through co-axial apertures drilled in the opposite side walls 3 of the member 1 near the plane of the upper wall 2 and through a dimetrical aperture drilled in the swinging arm 10 near the innermost end thereof.

In the embodiment of FIGURE 2, the swinging arm 10 is secured at a midpoint of its length within the tubular member 1 in the manner previously described with reference to FIGURE 1, but with the co-axial apertures located halfway between the upper wall 2 and the lower wall 2a of the member 1 along center line 16 and with the diametrical aperture located at said midpoint of the swinging arm 10.

The operation of the suspension means shown in the drawings is as follows:

The swinging arm 10 is capable of limited movement in an upright plane of rotation about the axis of the pivotal bolt 12 and in use is normally loaded in the direction of the arrow 13 through a road wheel (not shown) borne on the stub axle 10a. When the arm 10 is moved under load in the direction of the arrow 13 relative to the chassis member 1, the resilient bushing 4 becomes deformed.

In the embodiment of FIGURE 1 the resilient deformation occurs below the axis 11 of the arm 10 by elastic stretching (as indicated by the double headed arrows) and above the axis 11 by compression, of the material of the bushing. The member 1 is virtually suspended on the swinging arm 10 by the lower rubber of the bushing 4 situated between and bonded to the plate 5 and the arm 10. The upper rubber of the bushing 4, situated between the arm 10 and the upper wall 2 of the member 1, has a set of flexure holes 14 formed therein to allow the upper rubber to be more easily compressed into deformation. The said upper rubber provided with the flexure holes 14 acts to absorb shock upward movement of the arm 10 in the direction of the arrow 13 and to damp the normal movement of the arm 10.

In the embodiment of FIGURE 2, the aforesaid operation is substantially the same as that of the embodiment of FIGURE 1, excepting that end portion of the arm 10 lying inwardly of the pivot bolt 12 moves downwardly when the projecting part of the arm moves upwardly. Stretching of the rubber of the bushing 4 therefore occurs, in the embodiment of FIGURE 2, below and above the axis 11 of the arm 10 at opposite sides of the axis of the pivot bolt 12, similarly, compression of the rubber of the bushing 4 occurs both above and below the axis 11 of the arm 10, facilitated by two sets of flexure holes 14 (upper and lower), in converse relation with stretching areas of the bushing 4. The rubber-to-metal bonding in each embodiments is sufficiently secure to prevent a parting of the rubber of the bushing 4 from the arm 10 in the bore 4a and the plate 5, or plates 4 and 5a of FIGURE 2.

A lubrication point can be provided to the pivot bolt 12 or the bolt 12 can be borne in a sleeve, made of a plastics material such as nylon, mounted in the transverse apertures of the member 1 and avoiding the need for lubrication.

I claim:

1. A resilient suspension for a vehicle frame supported by at least one wheel through the intermediary of said resilient suspension comprising
    (a) a tubular member adopted to be fixedly attached to the frame and having at least one end defining an opening;
    (b) a bushing made of a resilient deformable material located within the end of the member;
    (c) a swinging arm carried by the resilient bushing to extend partly inside the member and to partly project beyond the end of said member;
    (d) means provided on the projecting part of the swinging arm for mounting a wheel thereon;
    (e) coaxial apertures in opposite side walls of the member;
    (f) a diametric hole in the inside part of the swinging arm, and
    (g) a pivot bolt secured through said apertures and said diametric hole whereby said arm is secured for pivoting movement with respect to said member with said movement being resiliently limited by said bushing.

2. The resilient suspension according to claim 1 further comprising at least one metal plate having said bushing secured thereon by bonding and means for securing said plate with said bushing as a unit to the inside of a wall of the tubular member.

3. The resilient suspension according to claim 1 further comprising at least one plate on each of two opposing sides of said bushing and secured thereto by bonding, and means for securing said plates with said bushing as a unit to the inside of the walls of the tubular member.

4. The resilient suspension according to claim 1 further comprising a through bore in said bushing, the swinging arm passing through said bore and being bonded thereto.

5. The resilient suspension according to claim 1 further comprising a plurality of flexure holes in at least an upper half of said bushing.

6. The resilient suspension according to claim 1 in which the projecting part of the swinging arm forms a stub axle.

7. A resilient suspension for a vehicle frame supported by at least one wheel through the intermediary of said resilient suspension comprising
    (a) a rectangular section tubular member having two opposite side walls which are larger in depth than the width of its upper and lower walls and having at least one end defining an opening;
    (b) a unit comprising
        (i) a rectangular section bushing of resiliently deformable material and having a bore passing therethrough
        (ii) a swinging arm passing through said bore in the bushing and being secured thereto by bonding, and
        (iii) a rectilinear metal plate onto which the bushing is secured by bonding, said unit being secured within the open end of said tubular member to the lower wall of said member with a part of the swinging arm projecting beyond said open end.
    (c) means provided on the projecting part of the swinging arm for mounting a wheel thereon, and
    (d) a pivot bolt passing through a diametric hole in the part of the swinging arm located inside the member, whereby said arm is secured for pivoting movement relative to said member in an upright plane of rotation parallel to said opposite side walls and said movement is resiliently limited by said bushing.

8. The resilient suspension according to claim 7 in which the axes of said bore and the swinging arm are inclined at an angle relative to the lower wall of said member when said arm is at rest.

9. The resilient suspension according to claim 7 in which said bushing is made of resiliently deformable rubber and the swinging arm and the metal plate are bonded to said bushing by rubber-to-metal bonding.

10. The resilient suspension according to claim 7 in which said unit further comprises a second rectilinear metal plate secured to the opposite side of said bushing by bonding.

References Cited
UNITED STATES PATENTS

| | | | |
|---|---|---|---|
| 2,630,081 | 3/1953 | Kepner | 267—63 X |
| 2,684,845 | 7/1954 | Moulton | 267—63 X |

A. HARRY LEVY, Primary Examiner

U.S. Cl. X.R.

267—63; 301—125